No. 797,480. PATENTED AUG. 15, 1905.
C. T. WHITE.
BARREL LOCKING DEVICE.
APPLICATION FILED JULY 22, 1904.
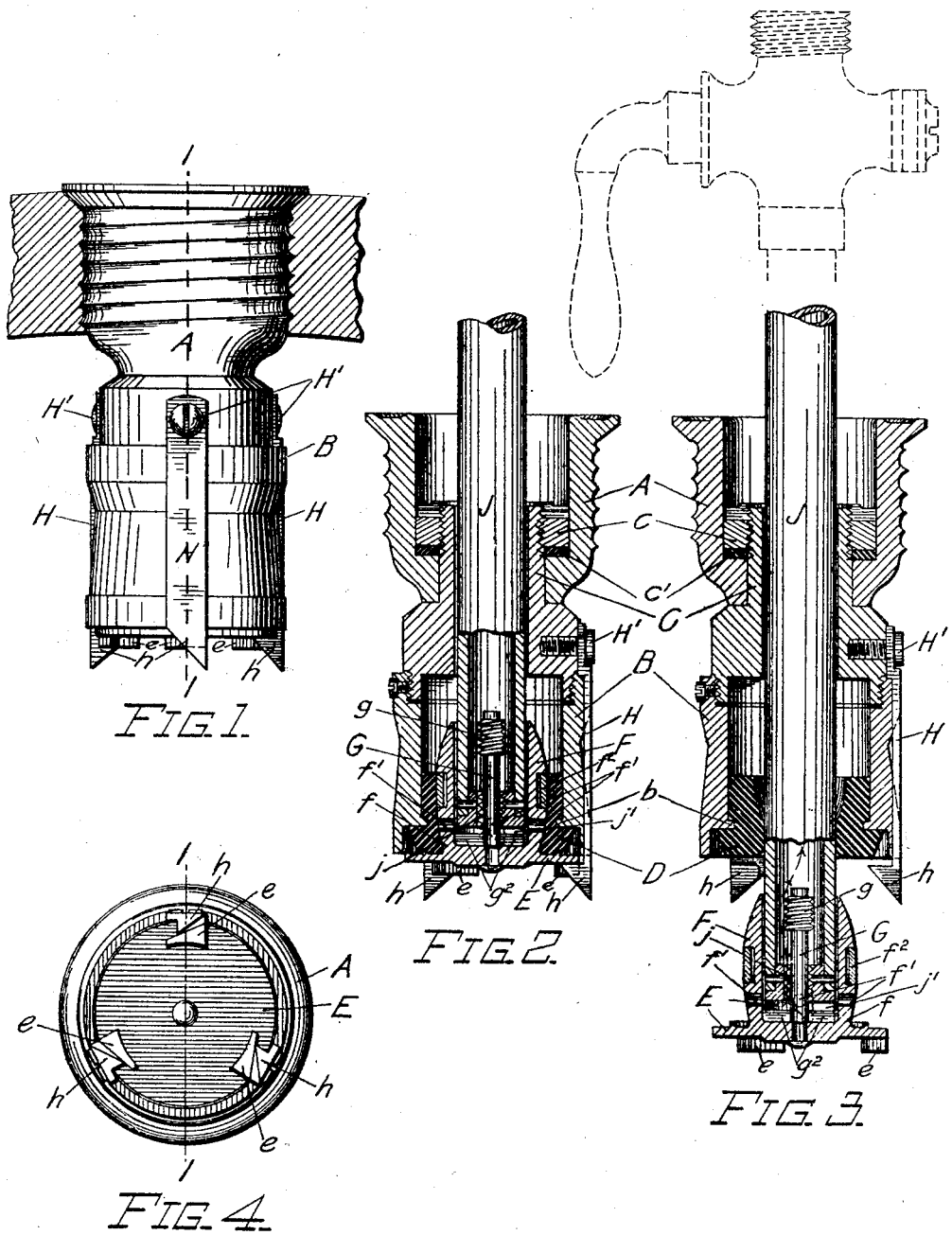
WITNESSES
INVENTOR
Charles T. White
Alexander & Dowell
Attorneys

UNITED STATES PATENT OFFICE.

CHARLES T. WHITE, OF NILES, MICHIGAN.

BARREL-LOCKING DEVICE.

No. 797,480.  Specification of Letters Patent.  Patented Aug. 15, 1905.

Application filed July 22, 1904. Serial No. 217,695.

*To all whom it may concern:*

Be it known that I, CHARLES T. WHITE, of Niles, in the county of Berrien and State of Michigan, have invented certain new and useful Improvements in Barrel-Locking Devices; and I hereby declare that the following is a full, clear, and exact description thereof, reference being had to the accompanying drawings, which form part of this specification.

This invention is a novel device for sealing barrels and other vessels from the inside, and is especially designed for use on beer-casks and barrels containing spirituous liquors, which are ordinarily provided with a bushing through which they can be tapped to withdraw their contents. My device can be attached to such bushings within the barrels and forms a perfect seal at all times and while not preventing the insertion of the tapping pipe or tube will seal the bushing when the pipe is withdrawn, so that if the barrel be emptied the gases will be retained therein and air excluded, thus preventing souring of the barrel and keeping it always in clean and sweet condition.

I will now describe the device as illustrated in the accompanying drawings and refer to the claims for summaries of the features and combinations of parts constituting the invention for which I desire protection.

In the drawings, Figure 1 is a side view of the device closed and attached to a barrel-bushing. Fig. 2 is a vertical section on line 1 1, Fig. 1, showing the tapping-pipe inserted in the bushing and engaged with the plug preparatory to unseating it. Fig. 3 is a similar view showing the plug unseated. Fig. 4 is a bottom plan view.

A designates an ordinary metal bushing, such as commonly employed in beer-barrels to facilitate tapping thereof, as in position in the walls of a barrel. Attached to this bushing is my improved sealing device, which consists of a cylindrical hollow metal body B, which is securely fastened to the bushing by means of a tubular neck C, projecting into the bushing through a corresponding opening in the bottom thereof and retained by means of a ring nut $c$ screwed onto the neck, a washer $c'$ being interposed between the ring nut and bottom of the bushing to make a gas-tight joint therebetween. The body is hollow, and within its lower end is a flange $b$, upon which is seated a thick annular rubber bib or packing-ring D, which forms the seat for the closure or plug, which comprises a bottom disk E and a cylindrical portion F. The portion F is of an external diameter slightly greater than the internal diameter of the rubber bib D and is slightly contracted at bottom, (or next the disk,) as at $f$, so that when the disk is pulled up tightly against the bib the contraction of the latter around the part $f$ will tend to draw the disk tightly against the bib and retain the plug in place. Within the tubular plug is an axially-arranged pin G, on the upper end of which is an enlarged exteriorly-screw-threaded head $g$ for a purpose hereinafter explained. In the plug, below the head $g$ and above the disk, are ports or inlet-openings $f'$, and above these ports is a packing-ring $f^2$, which when the plug is seated, as in Fig. 2, assists in making and maintaining a close joint between the plug and packing-ring. In the plug, at the base of the pin G, are radial ribs or projections $g^2$ for a purpose hereinafter explained. The plug is further held positively closed by spring-catches H, which are arranged around the body and are fastened at their upper ends by screws H', and their lower ends, projecting slightly below the body, are provided with hooks $h$, which project inwardly sufficiently to catch over or under the edges of disk E and retain it in position. The disk E is provided on its under side with cams $e$, which are so shaped and located as to simultaneously engage with the hooks $h$ and force them outward, if the disk be rotated, so as to release the plug and permit it to be lowered from the body and opened. The plug is manipulated by means of the pipe J, which may be the draw-off or tapping tube ordinarily employed to decant the liquor; but in order to adapt it to operate the plug its inner end must be modified or constructed as follows: The inner end of the tube is provided with an interior interrupted screw-thread $j$, which is adapted to engage the threaded head $g$ on pin G of the plug. This threaded portion $j$ is short, and by turning the tube sufficiently the threaded portion $j$ will clear the head $g$ and allow the end of the tube to drop or pass to the bottom of the plug, and the end of the tube is provided with notches $j'$, adapted to engage the ribs $g^2$ in the plug, so as to cause the stem to rotate with the tube.

Operation: The tube is inserted in the bushing and into the part F of the plug, which projects into the body A. The tube is then turned until its threaded portion $j$ screws past the head $g$ on the pin G and drops down onto the bottom of the plug into engagement with the ribs $g^2$. The tube is then turned and pressed downward, and as disk E turns its cams $e$ force catches H outward until the disk E can clear them, when the plug can be forced downward with the tube. The bib D makes a close joint with the tube J, and the liquid can escape into the tube through the ports in the plug, as will be clear from Fig. 3. The plug remains suspended on the tube, and when it is desired to remove the latter it is pulled outward, drawing the plug back through the bib and seating the disk E against the latter, where it is held by the catches H, as in Fig. 2. The greater the gas-pressure the more tight and secure is the contact between the plug and the bib, and a certain gas-tight joint is formed. The peculiar structure of the plug requires the operator to fully seat the plug before he can withdraw the tube, and the catches H prevent the plug being pushed downward before it is fully and properly engaged with the tube. When the plug is opened, it remains suspended from the tube, and before the tube can be withdrawn the plug is seated. Owing to the form of the plug and the bib there is no appreciable loss or venting of gas at the time when the bib slips from contact with the plug into contact with the tube, and vice versa.

By this device the loss of effervescent liquids or gas is effectively prevented and the air excluded, so that the barrels or casks fitted with these closures will be kept clean and sweet. While particularly designed for barrels and casks, I do not restrict the closure to such specific use thereof.

Having thus described my invention, what I therefore claim as new, and desire to secure by Letters Patent thereon, is—

1. In combination, a hollow body, an annular gasket in the lower end thereof, a plug adapted to engage the gasket, catches on the body for locking the plug, and means to release the catches when the plug is partly rotated; with means for detachably engaging the plug, rotating it to release it from the catches to suspend it while released, and return it to place, substantially as described.

2. In combination, a hollow body, an annular gasket in the lower end thereof, a plug adapted to fill the opening in the gasket, catches on the body for locking the plug, and cams on the plug adapted to release the catches when the plug is partly rotated; with a draw-off tube adapted to detachably engage the plug, rotate it to release it from the catches, suspend it while released, and return it to place, substantially as described.

3. The combination of the body, a plug to close the lower end of the body, a disk on the lower end of the plug having cams, and catches on the body adapted to engage the disk and lock the plug in place until disengaged by the action of the cams on the disk, substantially as described.

4. The combination of the body, a tubular plug adapted to enter the body, a pin in said plug having an enlarged screw-threaded head, a disk on the lower end of the plug provided with cam-facets, a screw-threaded draw-off tube and catches on the body adapted to engage the disk until disengaged therefrom by the cam-lugs, substantially as described.

5. The combination of the bushing, the body attached thereto, the bib or bushing in the lower end of the body, a tubular plug engaging said bib to close the lower end of the body, a disk on the lower end of the plug having cams, and catches on the body adapted to engage the disk and lock the plug in place until disengaged by the action of the cams on the disk, substantially as described.

6. The combination of the body having a bib or bushing in its lower end, a tubular plug adapted to engage the bib, and a pin on said plug having an enlarged screw-threaded head; with a draw-off tube having its lower end internally threaded to engage the threaded pin, whereby the plug may be unseated by the insertion of the tube and reseated by the withdrawal of the tube, substantially as described.

7. The combination of the body having a bib or bushing in its lower end, a tubular plug adapted to enter the body and engage the bib, a pin in said plug having an enlarged screw-threaded head, and radial lugs at the bottom of the pin, a disk on the lower end of the plug provided with cam-facets, a threaded draw-off tube and catches on the body adapted to engage the disk until disengaged therefrom by the cam-lugs, substantially as described.

8. The combination of the body having a bib or bushing in its lower end, a tubular plug adapted to enter the body and engage the bib, a pin in said plug having an enlarged screw-threaded head, and radial lugs at the bottom of the pin, a disk on the lower end of the plug provided with cam-facets, and catches on the body adapted to engage the disk until disengaged therefrom by the cam-lugs; with a draw-off tube having a threaded and notched inner end adapted to engage the threaded pin and radial lugs of the plug, substantially as and for the purpose described.

9. The combination of the bushing, the body attached thereto, the plug having a tubular portion adapted to enter the body, and a disk portion adapted to close the lower end thereof having exterior cam-lugs, a pin within the tubular portion having a screw-thread part; with catches on the body adapted to engage the disk and retain the plug in closed position, substantially as described.

10. The combination of the bushing, the body attached thereto, a screw-threaded draw-off tube the annular bib or gasket in the lower end of the body, the plug having a tubular portion adapted to enter the gasket and a disk portion adapted to close the inner end of the body, and having exterior cam-lugs, and a pin within the tubular portion having an enlarged screw-threaded head; with catches on the body adapted to engage the disk and retain the plug in closed position, all adapted to operate substantially as described.

11. The combination of the bushing, the body attached thereto, the plug having a tubular portion adapted to enter the body, and a disk portion adapted to close the lower end thereof, having exterior cam-lugs, and a pin within the tubular portion having a screw-thread part; with catches on the body adapted to engage the disk and retain the plug in closed position, a draw-off tube having a threaded lower end adapted to engage the threaded part of the plug whereby the plug may be turned so as to release the catches, the plug remaining suspended on the tube while the latter is in operation, and being reseated in the body by the withdrawal of the tube, all substantially as described.

12. The combination of the bushing, the body attached thereto, the annular bib or gasket in the lower end of the body, the plug having a tubular portion adapted to enter the gasket and a disk portion adapted to close the inner end of the body, and having exterior cam-lugs, and a pin within the tubular portion having an enlarged screw-threaded head; with catches on the body adapted to engage the disk and retain the plug in closed position, a draw-off tube having an internally-threaded lower end adapted to engage the threaded head of the pin, and whereby the plug may be turned so as to release the catches, the plug remaining suspended on the tube, while the latter is in operation, and being reseated in the body by the withdrawal of the tube, all substantially as described.

In testimony that I claim the foregoing as my own I affix my signature in presence of two witnesses.

CHARLES T. WHITE.

Witnesses:
CHAS. DOOLITTLE,
D. A. SHAW.